United States Patent
Fayt et al.

(10) Patent No.: US 9,332,500 B2
(45) Date of Patent: May 3, 2016

(54) METHOD FOR CONTROLLING ELECTRONIC EQUIPMENT, ASSOCIATED ELECTRONIC EQUIPMENT AND COMMUNICATION SYSTEM

(71) Applicant: ALSTOM TRANSPORT TECHNOLOGIES, Levallois-Perret (FR)

(72) Inventors: Etienne Fayt, Nimy (BE); Renaud Comte, Saint Alban De Roche (FR)

(73) Assignee: ALSTOM TRANSPORT TECHNOLOGIES, Levallois-Perret (FR)

( * ) Notice: Subject to any disclaimer, the term of this patent is extended or adjusted under 35 U.S.C. 154(b) by 0 days.

(21) Appl. No.: 14/455,405

(22) Filed: Aug. 8, 2014

(65) Prior Publication Data
US 2015/0045086 A1    Feb. 12, 2015

(30) Foreign Application Priority Data
Aug. 9, 2013  (FR) ..................................... 13 57920

(51) Int. Cl.
| H04B 7/00 | (2006.01) |
| H04W 52/04 | (2009.01) |
| H04W 52/24 | (2009.01) |
| H04W 84/00 | (2009.01) |
| H04W 84/12 | (2009.01) |
| H04W 52/22 | (2009.01) |

(52) U.S. Cl.
CPC ............ *H04W 52/04* (2013.01); *H04W 52/245* (2013.01); *H04W 52/246* (2013.01); *H04W 52/228* (2013.01); *H04W 84/005* (2013.01); *H04W 84/12* (2013.01)

(58) Field of Classification Search
USPC ........................ 455/522, 69–70; 370/310–320
See application file for complete search history.

(56) References Cited

U.S. PATENT DOCUMENTS

| 7,577,415 | B1 * | 8/2009 | Richards et al. ............... 455/266 |
| 8,781,518 | B2 * | 7/2014 | Nakamura et al. ............. 455/522 |
| 2005/0128970 | A1 * | 6/2005 | Tsien et al. .................... 370/315 |
| 2005/0138671 | A1 * | 6/2005 | Love et al. ..................... 725/123 |
| 2012/0149426 | A1 * | 6/2012 | Nakamura et al. ............ 455/522 |
| 2013/0170420 | A1 | 7/2013 | Kobayashi |

OTHER PUBLICATIONS

Preliminary Search Report and Opinion in French dated Feb. 27, 2014 issued for No. FR1357920 filed Aug. 9, 2013.

* cited by examiner

*Primary Examiner* — Fayyaz Alam
(74) *Attorney, Agent, or Firm* — Knobbe, Martens, Olson & Bear, LLP

(57) ABSTRACT

A method can control electronic equipment. The electronic equipment includes a wireless transceiver and is able to communicate with an electronic station. The wireless transceiver is able to receive wireless signals from the station with a variable receiving power level. The receiving power level depends on the transmission power level of the station, and the wireless transceiver is able to transmit wireless signals to the station. The method includes measuring the receiving power level of the wireless signals, comparing the receiving power level with a first threshold and a second threshold, and transmitting wireless signals with a first power level or a second power level based on the comparison results obtained.

15 Claims, 4 Drawing Sheets

METHOD FOR CONTROLLING ELECTRONIC EQUIPMENT, ASSOCIATED ELECTRONIC EQUIPMENT AND COMMUNICATION SYSTEM

FIELD OF THE INVENTION

In one embodiment, he present invention relates to a method for controlling electronic equipment, the electronic equipment including a wireless transceiver and being able to communicate with an electronic station including wireless communication means, the wireless transceiver being able to receive wireless signals from the station with a variable receiving power level, the receiving power level depending on the transmission power level of the station, and the wireless transceiver being able to transmit wireless signals to the station.

Other embodiments of the invention also relate to electronic equipment able to communicate with an electronic station including wireless communication means. The equipment comprises a wireless transceiver able to receive wireless signals from the station with a variable receiving power level, the receiving power level depending on the transmission power level of the station, the wireless transceiver being able to transmit wireless signals to the station.

Another embodiment of the invention also relates to a communication system including a plurality of electronic stations, each electronic station including wireless communication means.

BACKGROUND OF THE INVENTION

In the field of railroad transportation, different communication systems are known ensuring the transfer of computer data between a railroad vehicle and a motionless electronic station positioned along a railroad track, also called a railway track.

Wireless communication systems for example exist allowing electronic equipment onboard the railroad vehicle to communicate with an electronic station fixed to the ground. This communication is generally in accordance with standard IEEE 802.11.

Since the railroad vehicle is in motion, the communication system advantageously includes a plurality of electronic stations arranged along the railroad track, in order to provide continuous communication with the electronic equipment.

A control method is also known allowing the electronic equipment to adjust the transmission power of the data to the station based on the reception power of the data coming from that station. According to this control method, also known under the acronym TPC (Transmit Power Control), the transmission power level follows a complex control law so that the receiving power level is more or less homogenous from one piece of electronic equipment to another.

Such a control method allows the equipment to optimize its electricity consumption and, generally, to reduce the electromagnetic pollution in the environment. This method is primarily used in a static environment, in which the electronic equipment and the electronic station are substantially immobile. It is in particular used in communication systems according to standard IEEE 802.11.

However, such a control method is not suitable for use in a dynamic environment, for example when the electronic equipment is positioned in a moving railroad vehicle and communicates with an immobile electronic station positioned along a railroad track.

U.S. Pat. No. 7,577,415 to Richards et al. and U.S. Patent Publication Nos. 2005/0128970 of Tsien et al. and 2013/01710420 of Kobayashi are hereby incorporated by reference. No admission is made that these documents represent prior art to the present application.

SUMMARY OF THE INVENTION

One embodiment described herein proposes a control method making it possible to improve the transmission of data between the electronic equipment and the electronic station(s), in particular in a dynamic environment when the electronic equipment is positioned in a moving railroad vehicle and communicates with an immobile electronic station, positioned along a railroad track.

To that end, one embodiment relates to a control method of the aforementioned type, wherein the method comprises the following steps:

the electronic equipment measures the receiving power level of the wireless signals from the station;

the receiving power level is compared with at least one threshold from among a first threshold and a second threshold, the first threshold being greater than the second threshold, and the transceiver transmits the following wireless signals, with a power level equal to:
  a first transmission power level if the receiving power level is less than or equal to the second threshold during the preceding comparison step, or
  a second transmission power level if the receiving power level is greater than or equal to the first threshold during the preceding comparison step,
  the first transmission power level being strictly greater than the second transmission power level.

According to other advantageous aspects of certain embodiments, the method comprises one or more of the following features, considered alone or according to all technically possible combinations:

the method further comprises an initial step for the transmission of wireless signals by the transceiver with the first transmission power level;

the method further comprises an initial step for the transmission of wireless signals by the transceiver with the second transmission power level;

the wireless transceiver and wireless communication means are in accordance with standard IEEE 802.11;

the value of the first threshold is comprised between −45 dBm and −40 dBm, preferably substantially equal to −42 dBm;

the value of the second threshold is comprised between −50 dBm and −45 dBm, preferably substantially equal to −47 dBm;

during the step for transmitting the following wireless signals, the transceiver is able to transmit the following wireless signals with the first transmission power level if the receiving power level is less than or equal to the first threshold for Nc2 consecutive preceding comparison steps, Nc2 being an integer greater than or equal to two;

during the step for transmitting the following wireless signals, the transceiver is able to transmit the following wireless signals with the second transmission power level if the receiving power level is greater than or equal to the second threshold for Nc1 consecutive preceding comparison steps, Nc1 being an integer greater than or equal to two.

Other embodiments also relate to a piece of electronic equipment of the aforementioned type, further comprising:

means for measuring the receiving power level of the wireless signals from the station;

means for comparing the receiving power level with at least one threshold from among a first threshold and a second threshold, the first threshold being greater than the second threshold;

the transceiver being able to transmit the following wireless signals with a power level equal to:

a first transmission power level if the receiving power level (Pr) is less than or equal to the second threshold, or a second transmission power level if the receiving power level is greater than or equal to the first threshold, the first transmission power level being strictly greater than the second transmission power level.

According to other advantageous aspects of the invention, the electronic equipment comprises one or more of the following features, considered alone or according to any technically possible combinations:

the transceiver is able to transmit the following wireless signals with the first transmission power level if the receiving power level is less than or equal to the first threshold for Nc2 consecutive preceding comparison steps, Nc2 being an integer greater than or equal to two;

the transceiver is able to transmit the following wireless signals with the second transmission power level if the receiving power level is greater than or equal to the second threshold for Nc1 consecutive preceding comparison steps, Nc1 being an integer greater than or equal to two.

Embodiments of the invention also relate to a communication system of the aforementioned type, further including at least one piece of electronic equipment as defined above, able to communicate with at least one electronic station.

According to another advantageous aspect of certain embodiments, the communication system includes the following feature:

each piece of electronic equipment is able to be positioned in a moving railroad vehicle, and is able to communicate with at least one immobile electronic station, positioned along a railroad track.

BRIEF DESCRIPTION OF THE FIGURES

These features and advantages of the systems and methods describe herein will appear upon reading the following description, provided solely as an example, and done in reference to the appended drawings, in which.

DETAILED DESCRIPTION

In the rest of the description, the expression "substantially equal to" is understood as an equality relationship to within 5%.

Figure 1:
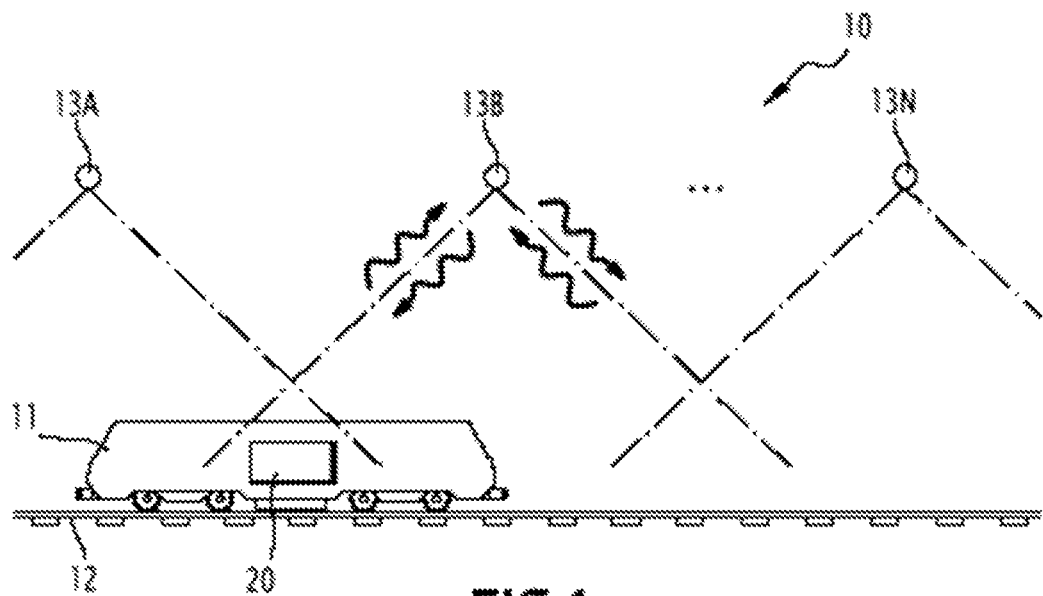
FIG. 1 is a view of a communication system according to an embodiment of the invention, the communication system including a plurality of electronic stations and a piece of electronic equipment positioned in a railroad vehicle moving on a railroad track.

A communication system 10 according to an embodiment of the invention is diagrammatically illustrated in FIG. 1. The communication system 10 is for example installed in a railroad facility including a railroad vehicle 11 and a railroad track 12, also called railway track. The vehicle 11 is able to move along the railroad track 12 with a variable speed.

The communication system 10 includes a plurality of electronic stations 13A to 13N, for example installed near the railroad track 12, said stations 13A to 13N preferably being immobile.

Figure 2:
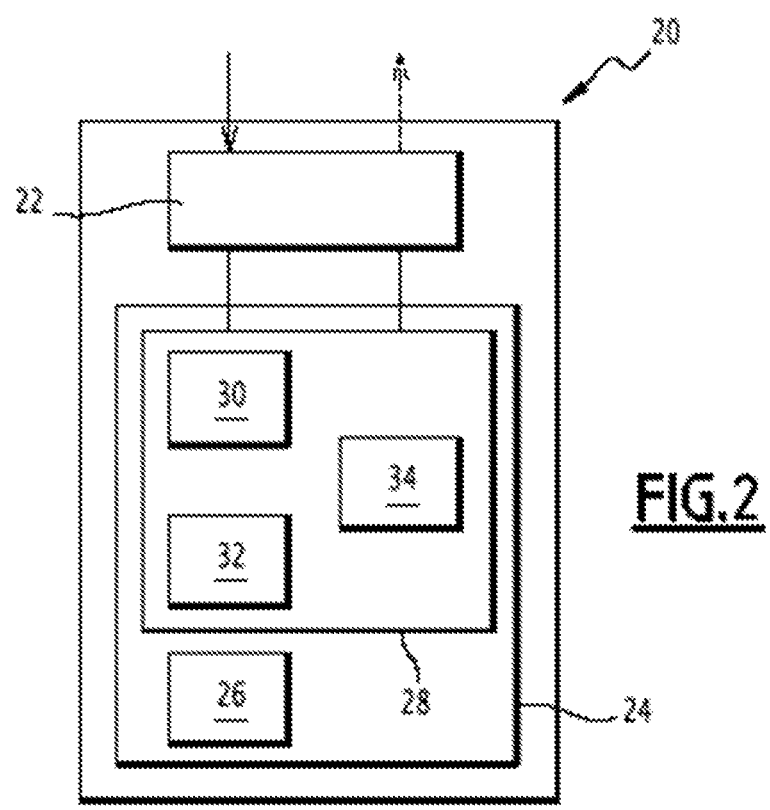
FIG. 2 is a diagrammatic view of the piece of electronic equipment of FIG. 1.

The communication system 10 further includes a piece of electronic equipment 20, illustrated in more detail in FIG. 2, the equipment 20 being able to exchange data with one or more electronic stations 13A to 13N by transmitting wireless waves, i.e., by wireless communication.

In the described example, the communication system 10 forms a communication network in accordance with standard IEEE 802.11, also called the Wi-Fi standard, the equipment 20 and the electronic stations 13A to 13N being in accordance with standard IEEE 802.11.

Of course, the communication system 10 is not limited to a single piece of electronic equipment 20. Alternatively, it includes a plurality of pieces of such electronic equipment 20.

Each station 13A to 13N includes wireless communication means, not shown, making it possible to receive and send wireless signals in a coverage area of that station. The wireless communication means of each station 13A to 13N are in accordance with standard IEEE 802.11.

Each coverage area is defined by a transmission power of the wireless signals from the corresponding station.

Thus, for example, the stations 13A to 13N can be fixed along the railroad track 12 in order to ensure continuous coverage of the railroad track 12. One example of such continuous coverage is illustrated in FIG. 1.

Under actual operating conditions, the coverage area of a station 13A to 13N allows variations based on outside conditions such as the propagation conditions relative to the terrain, or the presence of obstacles.

The piece of electronic equipment 20 is for example onboard the railroad vehicle 11, and is able to communicate with at least one station 13A to 13N in its coverage area.

As illustrated in FIG. 2, the piece of electronic equipment 20 includes a wireless transceiver 22 able to receive wireless signals from a station 13A to 13N with a variable receiving power level Pr. The receiving level Pr varies based on the transmission power level of the station 13A to 13N.

The electronic equipment 20 also comprises an information processing unit 24, for example made up of a processor 26 and a memory 28.

The transceiver 22 is capable of receiving wireless signals from the station 13A to 13N, and is also capable of transmitting wireless signals to the corresponding station 13A to 13N with a variable-value transmission power level, the transmission power level for example being equal to a first transmission power level Pe1 or a second transmission power level Pe2.

The transceiver 22 is in accordance with standard IEEE 802.11.

The first transmission power level Pe1 is strictly greater than the second transmission power level Pe2. The value of the first transmission power level Pe1 is for example comprised between 25 dBm and 30 dBm, preferably substantially equal to 27 dBm. The value of the second transmission power level Pe2 is for example comprised between 17 dBm and 23 dBm, preferably substantially equal to 20 dBm.

The memory 28 is capable of storing software 30 for measuring the receiving power level Pr. The memory 28 is also capable of storing software 32 for comparing the receiving power level Pr with at least one threshold from among a first threshold TPC1 and a second threshold TPC2.

The first threshold TPC1 is strictly greater than the second threshold TPC2. The value of the first threshold TPC1 is for example comprised between −45 dBm and −40 dBm, preferably substantially equal to −42 dBm. The value of the second threshold TPC2 is for example comprised between −45 dBm and −50 dBm, preferably substantially equal to −47 dBm.

The memory 28 is capable of storing software 34 for controlling the transceiver 22, in particular based on the receiving power level Pr measured by the measuring software 30 and the result of the comparison of the measured receiving power level Pr with the or each threshold, that result being provided by the comparison software 32.

The control software 34 is capable of controlling the transmission power level of the transceiver 22.

According to some embodiments of the invention, the transmission power level of the following wireless signals, transmitted to a corresponding electronic station 13A to 13N, is equal to:

the first transmission power level Pe1, if the receiving power level Pr, measured by the measuring software 30, is less than or equal to the second threshold TPC2, during the comparison done by the comparison software 32, or the second transmission power level Pe2, if the receiving power level Pr is greater than or equal to the first threshold TPC1 during the comparison done by the comparison software 32.

Figure 3:
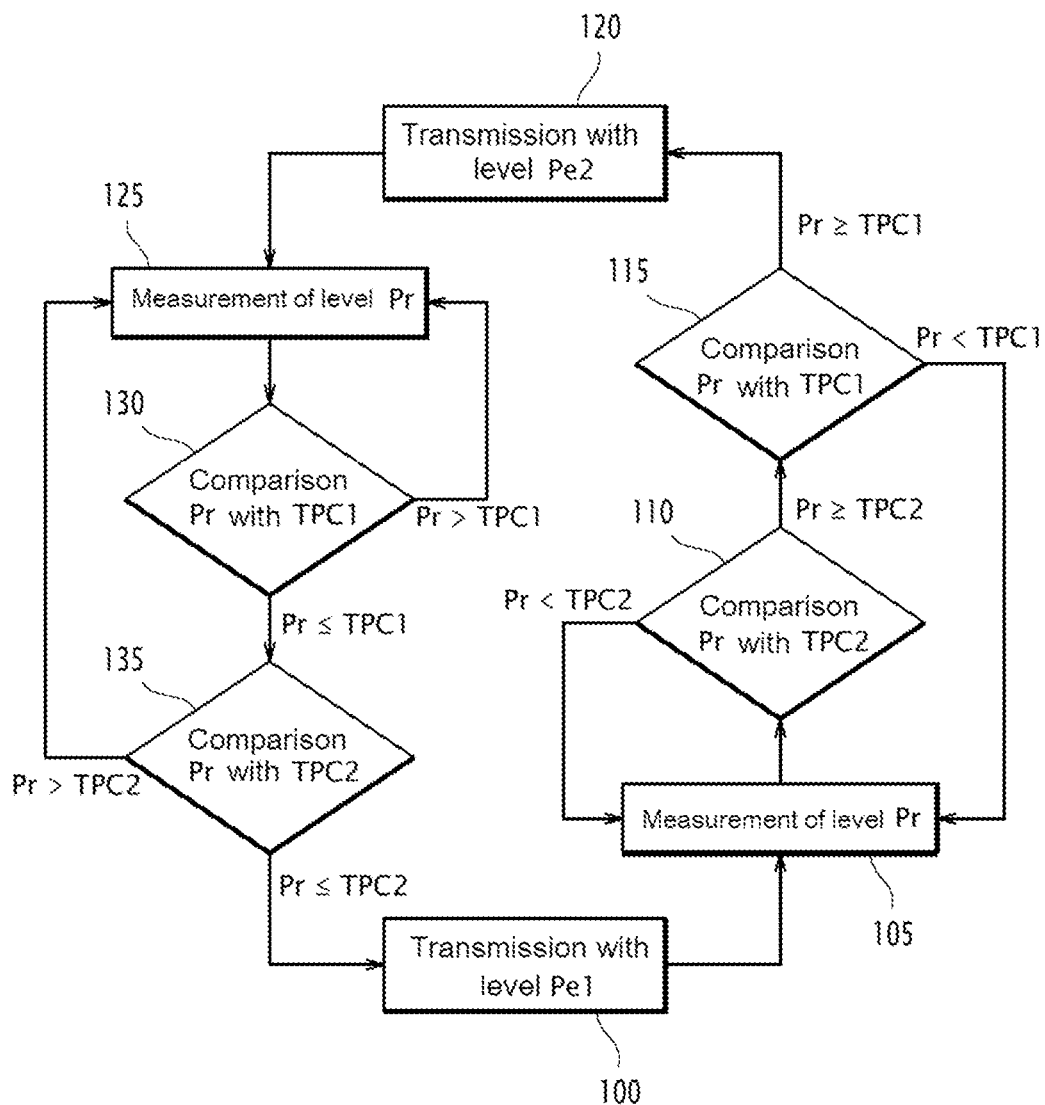
FIG. 3 is a flowchart of a control method according to an exemplary embodiment the invention.

The operation of the communication system 10 and the electronic equipment 20 will now be described using the flowchart of FIG. 3, illustrating the control method according to certain embodiments of the invention.

The electric stations 13A to 13N transmit wireless signals, each with a predetermined transmission power level.

The electronic equipment 20, located in the coverage area of a station 13A to 13N, begins by transmitting wireless signals to that station 13A to 13N.

During an initial step 100, the transceiver 22 of the electronic equipment transmits wireless signals to the corresponding station 13A to 13N with the first transmission power level Pe1.

The measuring software 30 next measures the receiving power level Pr during step 105.

During step 110, the comparison software 30 compares the receiving power level Pr measured in step 105 with the second threshold TPC2.

If the receiving power level Pr is strictly less than the second threshold TPC2, the control software 34 returns to step 105.

If the receiving power level Pr is greater than or equal to the second threshold TPC2, the control software 34 goes to step 115.

During step 115, the comparison software 30 compares the receiving power level Pr measured during step 105 with the first threshold TPC1.

If the receiving power level Pr is strictly below the first threshold TPC1, the control software 34 returns to step 105.

If the receiving power level Pr is greater than or equal to the first threshold TPC1, the control software 34 goes to step 120.

During step 120, the transceiver 22 of the electronic equipment 20 changes transmission power levels, and then transmits wireless signals to the corresponding station 13A to 13N with the second transmission power level Pe2.

In other words, starting from a transmission power level equal to the first transmission power level Pe1, the control software 34 modifies the value of the transmission power level, which becomes equal to the second transmission power level Pe2 only if the receiving power level Pr is greater than or equal to the first threshold TPC1.

As long as the receiving power level is strictly less than the first threshold TPC1, or a fortiori less than the second threshold TPC2, the second threshold TPC2 being strictly less than the first threshold TPC1, the value of the transmission power level is not modified by the control software 34, and remains equal to the first transmission power level Pe1.

During step 125, following the potential transition of the transmission power value to the second transmission power value level Pe2, the measuring software 30 measures the receiving power level Pr.

During step 130, the comparison software 30 compares the receiving power level Pr measured in step 125 with the first threshold TPC1.

If the receiving power level Pr is strictly greater than the first threshold TPC1, the control software 34 returns to step 125.

If the receiving power level Pr is less than or equal to the first threshold TPC1, the control software 34 goes on to step 135.

During step 135, the comparison software 30 compares the receiving power level Pr measured in step 125 with the second threshold TPC2.

If the receiving power level Pr is strictly greater than the second threshold TPC2, the control software 34 returns to step 125.

If the receiving power level Pr is less than or equal to the second threshold TPC2, the control software 34 goes to step 100, during which the value of the transmission power level is changed, and is then positioned at the first transmission power level Pe1.

In other words, starting from a transmission power level equal to the second transmission power level Pe2, the control software 34 modifies the value of the transmission power level, which becomes equal to the first transmission power level Pe1 only if the receiving power level Pr is less than or equal to the second threshold TPC2.

As long as the transmission power level is strictly greater than the second threshold TPC2, or a fortiori greater than the first threshold TPC1, the first threshold TPC1 being strictly greater than the second threshold TPC2, the value of the transmission power level is not modified by the control software 34, and remains equal to the second transmission power level Pe2.

When the condition tested in step 135 is verified, the method returns to the initial step 100, and the control of the transmission level by the transceiver 22 thus takes place in a loop.

A person skilled in the art will then understand that it would have been possible, alternatively, to begin transmitting wireless signals to the corresponding station 13A to 13N with the second transmission power level Pe2, i.e., to begin the method in step 120, then to continue with steps 125, 130, 135, before going to step 100 if the condition tested in step 135 is verified.

The control method thus defined allows the electronic equipment to manage its transmission power level while keeping a stable connection level with a corresponding electronic station 13A to 13N, even in a dynamic environment, like that of the railroad vehicle 11 moving along the railroad track 12. In fact, starting from a transmission power level equal to the first transmission power level Pe1, the value of the transmission power level is modified (becomes equal to the second transmission power level Pe2) only if the receiving power level Pr is greater than or equal to the first threshold TPC1. Similarly, starting from a transmission power level equal to the second transmission power level Pe2, the value of the transmission power level is modified (and becomes equal to the first transmission power level Pe1) only if the receiving power level Pr is less than or equal to the second threshold TPC2.

The transmission power level is thus modified only in the event of a significant variation in the receiving power level Pr, for example when the receiving power level Pr becomes greater than the first threshold TPC1, which has the largest value from among the two thresholds TPC1, TPC2, or when the receiving power level Pr becomes lower than the second threshold TPC2, which has the smallest value among the two thresholds TPC1, TPC2. The control method is therefore not sensitive to the small variations in the receiving power level Pr, unlike the control method of the state of the art.

This makes it possible to improve the stability of the data transmissions in the communication system 10, and also to guarantee better handover times between the electronic stations 13A to 13N.

Figure 4:
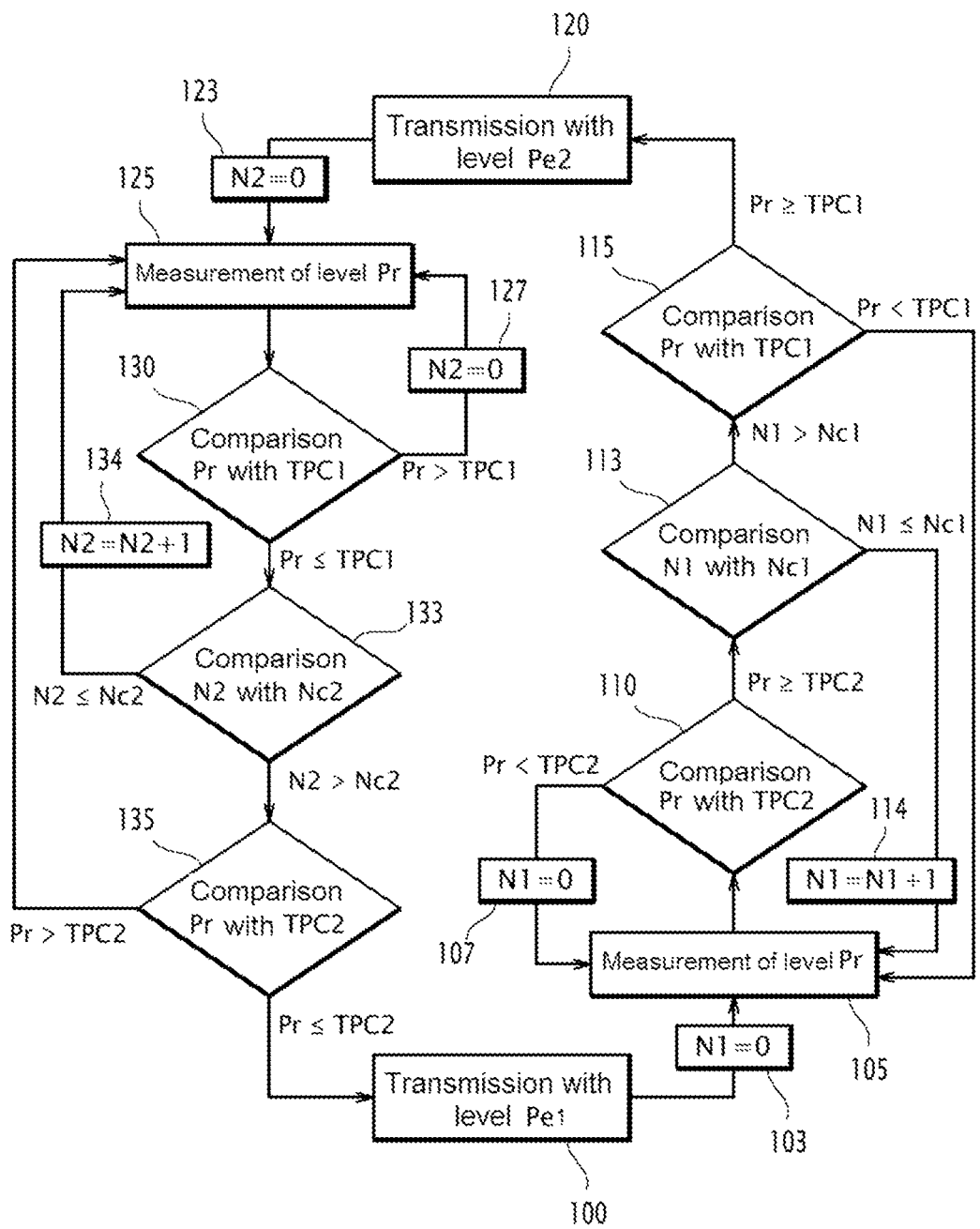
FIG. 4 is a flowchart of a control method according to an additional aspect of certain embodiments the invention.

A flowchart of the control method according to one additional aspect of the invention is illustrated in FIG. 4.

In this FIG. 4, the control method further includes a step 103 during which the control software 34 resets a first counter N1.

If, during the step 110 for comparing the receiving power level Pr with the second threshold TPC2, the receiving power level Pr is strictly below the second threshold TPC2, the control software 34 resets the first counter N1 during step 107 and goes to step 105 for measuring the receiving power level Pr.

Otherwise, the control software 34 goes to step 113.

During step 113, the comparison software 30 compares the first counter N1 with a first cycle number threshold Nc1 corresponding to the minimum number of consecutive cycles during which the receiving power level Pr must be greater than or equal to the second threshold TPC2 so that the control software 34 changes the transmission power level.

If the first counter N1 is less than or equal to the first cycle number threshold Nc1, the control software 34 increments the first counter N1 by one unit during step 114 and returns to step 105.

Otherwise, the control software 34 goes to step 115.

Similarly, the control method further includes a step 123 during which the control software 34 resets a second counter N2.

If, during step 130 for comparing the receiving power level Pr with the first threshold TPC1, the receiving power level Pr is strictly greater than the first threshold TPC1, the control software 34 resets the second counter N2 during step 127 and goes on to step 125 for measuring the receiving power level Pr.

Otherwise, the control software 34 goes to step 133.

During step 133, the comparison software 30 compares the second counter N2 with a second cycle number threshold Nc2 corresponding to the minimum number of consecutive cycles during which the receiving power level Pr must be less than or equal to the first threshold TPC1 so that the control software 34 changes the transmission power level.

If the second counter N2 is less than or equal to the cycle number threshold Nc2, the control software 34 increments the second counter N2 by one unit during step 134 and returns to step 125.

Otherwise, the control software 34 goes to step 135.

According to this control method, step 105 is launched upon each wireless signal transmission cycle by the corresponding electronic stations 13A to 13N when the transceiver 22 transmits wireless signals with the first transmission power level Pe1.

Similarly, step 125 is launched upon each wireless signal transmission cycle by the corresponding electronic stations 13A to 13N when the transceiver 22 transmits wireless signals with the second transmission power level Pe2.

The frequency of these cycles is for example substantially equal to 25 ms.

The value of each of the first cycle number threshold Nc1 and the second cycle number threshold Nc2 is chosen between 1 and 40, preferably between 1 and 12.

According to the control method described below, the change in the transmission power level to the second transmission power level Pe2 occurs only when step 110 for comparing the receiving power level Pr with the second threshold TPC2 indicates Nc1 consecutive times that the receiving power level Pr is greater than or equal to the second threshold TPC2.

Similarly, the change in the transmission power level to the first transmission power level Pe1 occurs only when step 130 for comparing the receiving power level Pr with the first threshold TPC1 indicates Nc2 consecutive times that the receiving power level Pr is less than or equal to the first threshold TPC1.

This makes it possible to perform a change in the transmission power level only when the receiving power level Pr is greater than or equal to the second threshold TPC2 or when the receiving power level Pr is less than or equal to the first threshold TPC1 during a significant time period equal to 1 s, preferably equal to 300 ms.

This makes it possible to avoid changes in the transmission power level for fluctuations of the receiving power level Pr around the threshold TPC1 and TPC2 having occurred during a time period shorter than 1 s, preferably less than 300 ms.

Such fluctuations in particular correspond to dropouts of the wireless signal, for example occurring when the railroad vehicle 11 enters a tunnel.

One can then see that this additional aspect of the invention makes it possible to stabilize the transmission power level during abrupt fluctuations in the receiving power level Pr.

Figure 5:
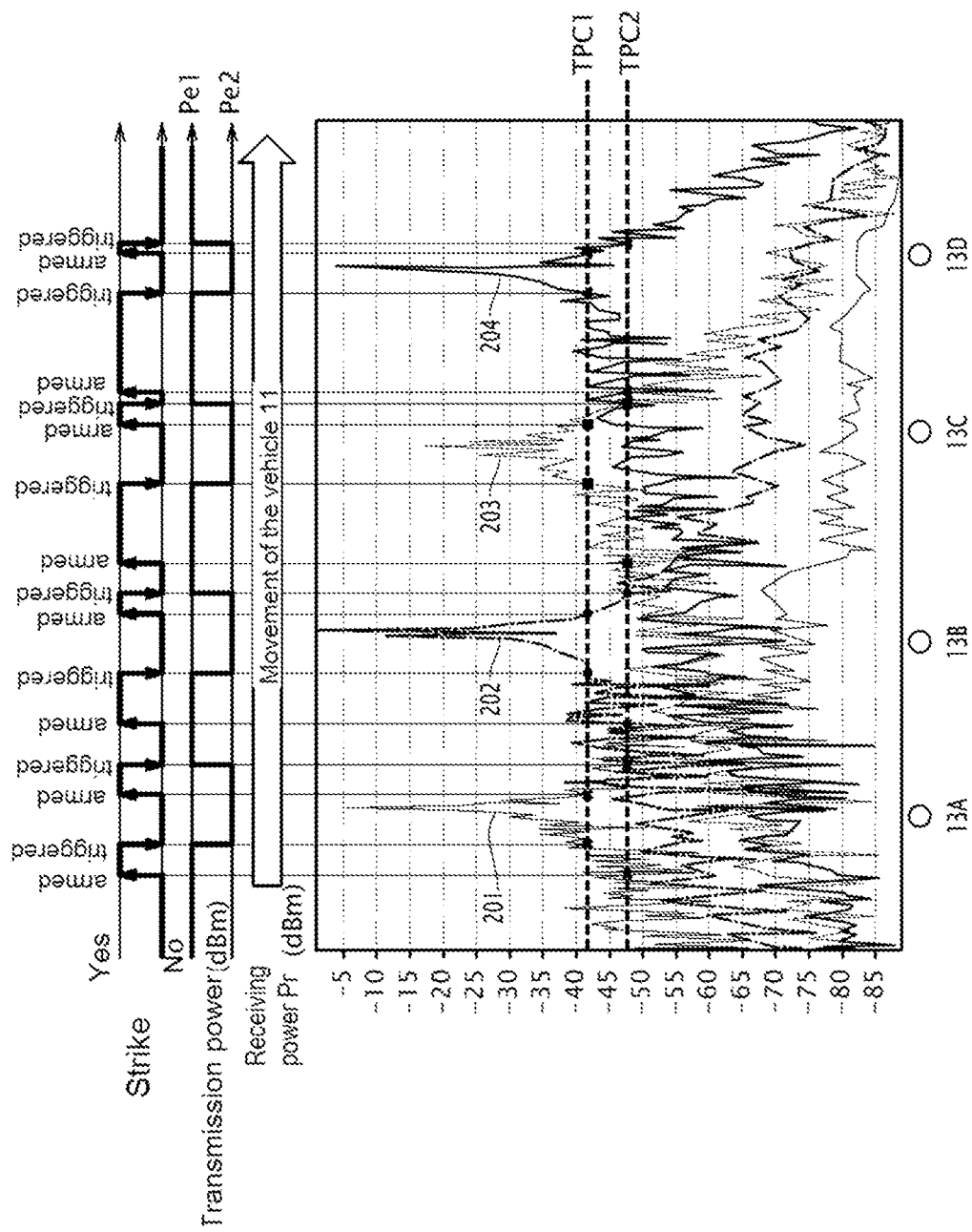
FIG. 5 is a diagram illustrating the operation of the electronic equipment.

FIG. 5 illustrates the management of the transmission power level by the electronic equipment 20 implemented by the control method according to an embodiment of the invention when the vehicle 11 moves along the railroad track 12 near stations 13A, 13B, 13C and 13D.

In this figure, the curve 201 corresponds to the receiving power level Pr for wireless signals transmitted by the station 13A, measured during steps 105 and 125 of the method, the curve 202 to the receiving power curve Pr for wireless signals transmitted by the station 13B, the curve 203 to the receiving power curve Pr for wireless signals transmitted by the station 13C, and the curve 204 to the receiving power curve Pr for wireless signals transmitted by the station 13D.

According to FIG. 5, a "strike" notion is illustrated, the latter being "armed" when the receiving power level Pr is comprised between the two thresholds TPC1 and TPC2, and being "triggered" when the receiving power level Pr is below the second threshold TPC2 or greater than the first threshold TPC1.

The triggering of the strike corresponds to a change in the transmission power level.

Initially, the transceiver 22 transmits wireless signals with the first transmission power level Pe1, and the strike is triggered.

According to the curve 201, when the receiving power level Pr becomes greater than or equal to the second threshold TPC2, the strike is armed.

When the receiving power level Pr becomes greater than or equal to the first threshold TPC1, the strike is triggered and the transceiver 22 begins to transmit wireless signals with the second transmission power level Pe2.

When the receiving power level Pr becomes less than or equal to the first threshold TPC1, the strike is once again armed.

When the receiving power level Pr becomes less than or equal to the second threshold TPC2, the strike is triggered and the transceiver 22 begins to transmit wireless signals with the first transmission power level Pe1.

This operating principle remains valid for the other curves 202, 203 and 204 corresponding to the stations 13B, 13C and 13D.

What is claimed is:

1. A method for controlling an electronic equipment, the electronic equipment comprising a wireless transceiver configured to communicate with an electronic station, the wireless transceiver being configured to receive wireless signals from the station with a variable receiving power level, the receiving power level depending on the transmission power level of the station, and the wireless transceiver being configured to transmit wireless signals to the station, the method comprising:
measuring the receiving power level of the wireless signal from the station with the electronic equipment;
performing a first comparison comprising comparing the receiving power level with a first threshold and if the receiving power level is less than or equal to the first threshold, comparing the receiving power level with a second threshold, the first threshold being greater than the second threshold;
performing a second comparison comprising comparing the receiving power level with the second threshold and if the receiving power level is greater than or equal to the second threshold, comparing the receiving power level with the first threshold; and
transmitting wireless signals with the transceiver, wherein the power level is equal to:
a first transmission power level if the receiving power level is less than or equal to the second threshold during the second comparison, or
a second transmission power level if the receiving power level is greater than or equal to the first threshold during the first comparison,
wherein the first transmission power level is greater than the second transmission power level.

2. The method according to claim 1, wherein the method further comprises an initial step of transmitting wireless signals with the transceiver at the first transmission power level.

3. The method according to claim 1, wherein the method further comprises an initial step for transmitting wireless signals with the transceiver with the second transmission power level.

4. The method according to claim 1, wherein the wireless transceiver is in accordance with standard IEEE 802.11, and wherein the electronic station comprises a wireless communication module in accordance with standard IEEE 802.11.

5. The method according to claim 1, wherein the value of the first threshold is between −45 dBm and −40 dBm.

6. The method according to claim 5, where the value of the first threshold is −42 dBm.

7. The method according to claim 1, wherein the value of the second threshold is between −50 dBm and −45 dBm.

8. The method according to claim 1, wherein the value of the second threshold is −47 dBm.

9. The method according to claim 1, further comprising transmitting wireless signals with the transceiver with the first transmission power level if the receiving power level is less than or equal to the first threshold for Nc2 consecutive preceding comparing steps, Nc2 being an integer greater than or equal to two.

10. The method according to claim 1, further comprising transmitting wireless signals with the transceiver with the second transmission power level if the receiving power level is greater than or equal to the second threshold for Nc1 consecutive preceding comparing steps, Nc1 being an integer greater than or equal to two.

11. A piece of electronic equipment that is configured to communicate wirelessly with an electronic station, the equipment comprising:
a wireless transceiver configured to receive wireless signals from the station with a variable receiving power level, the receiving power level depending on the transmission power level of the station, the wireless transceiver configured to transmit wireless signals to the station;
a measuring module configured to measure the receiving power level of the wireless signals from the station;
a first comparison module configured to compare the receiving power level with a first threshold and if the receiving power level is less than or equal to the first threshold, configured to compare the receiving power level with a second threshold, the first threshold being greater than the second threshold, and
a second comparison module configured to compare the receiving power level with the second threshold and if the receiving power level is greater than or equal to the second threshold, to compare the receiving power level with the first threshold,
wherein the transceiver is configured to transmit wireless signals with a power level equal to:
a first transmission power level if the receiving power level is less than or equal to the second threshold; or
a second transmission power level if the receiving power level is greater than or equal to the first threshold,
wherein the first transmission power level is greater than the second transmission power level.

12. The equipment according to claim 11, wherein the transceiver is configured to transmit wireless signals with the first transmission power level if the receiving power level is less than or equal to the first threshold for Nc2 consecutive preceding comparing steps, Nc2 being an integer greater than or equal to two.

13. The equipment according to claim 11, wherein the transceiver is configured to transmit wireless signals with the second transmission power level if the receiving power level is greater than or equal to the second threshold for Nc1 consecutive preceding comparing steps, Nc1 being an integer greater than or equal to two.

14. A communication system comprising a plurality of electronic stations, each electronic station configured to communicate wirelessly, wherein the communication system comprises at least one piece of electronic equipment configured to communicate with at least one electronic station, wherein the electronic equipment comprises:
a wireless transceiver configured to receive wireless signals from the station with a variable receiving power level, the receiving power level depending on the transmission power level of the station, the wireless transceiver configured to transmit wireless signals to the station;

a measuring module configured to measure the receiving power level of the wireless signals from the station;

a first comparison module configured to compare the receiving power level with a first threshold and if the receiving power level is less than or equal to the first threshold, to compare the receiving power level with a second threshold, the first threshold being greater than the second threshold; and a second comparison module configured to compare the receiving power level with the second threshold and if the receiving power level is greater or equal 5 than the second threshold, to compare the receiving power level with the first threshold;

wherein the transceiver is configured to transmit wireless signals with a power level equal to:
  a first transmission power level if the receiving power level is less than or equal to the second threshold; or
  a second transmission power level if the receiving power level is greater than or equal to the first threshold, and
wherein the first transmission power level is strictly greater than the second transmission power level.

15. The communication system according to claim 14, wherein each piece of electronic equipment is positioned in a moving railroad vehicle, and communicates with at least one immobile electronic station positioned along a railroad track.

* * * * *